Figure 1:
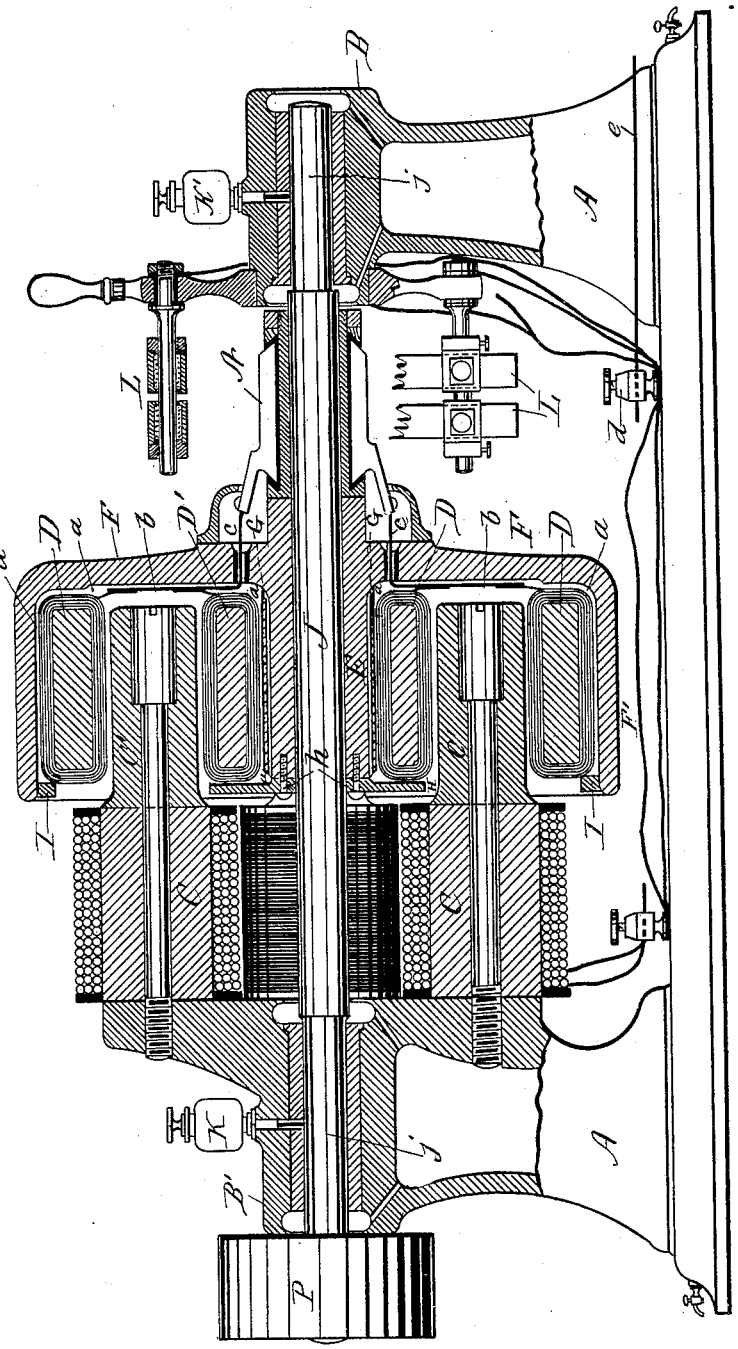

(No Model.)  4 Sheets—Sheet 1.

E. H. BENNETT, Jr.
ELECTRIC MACHINE.

No. 407,154.  Patented July 16, 1889.

WITNESSES:
Thomas S. Walling
Arthur E. Webb

INVENTOR
Edwin H. Bennett Jr.
By Ernest C. Webb
his Atty.

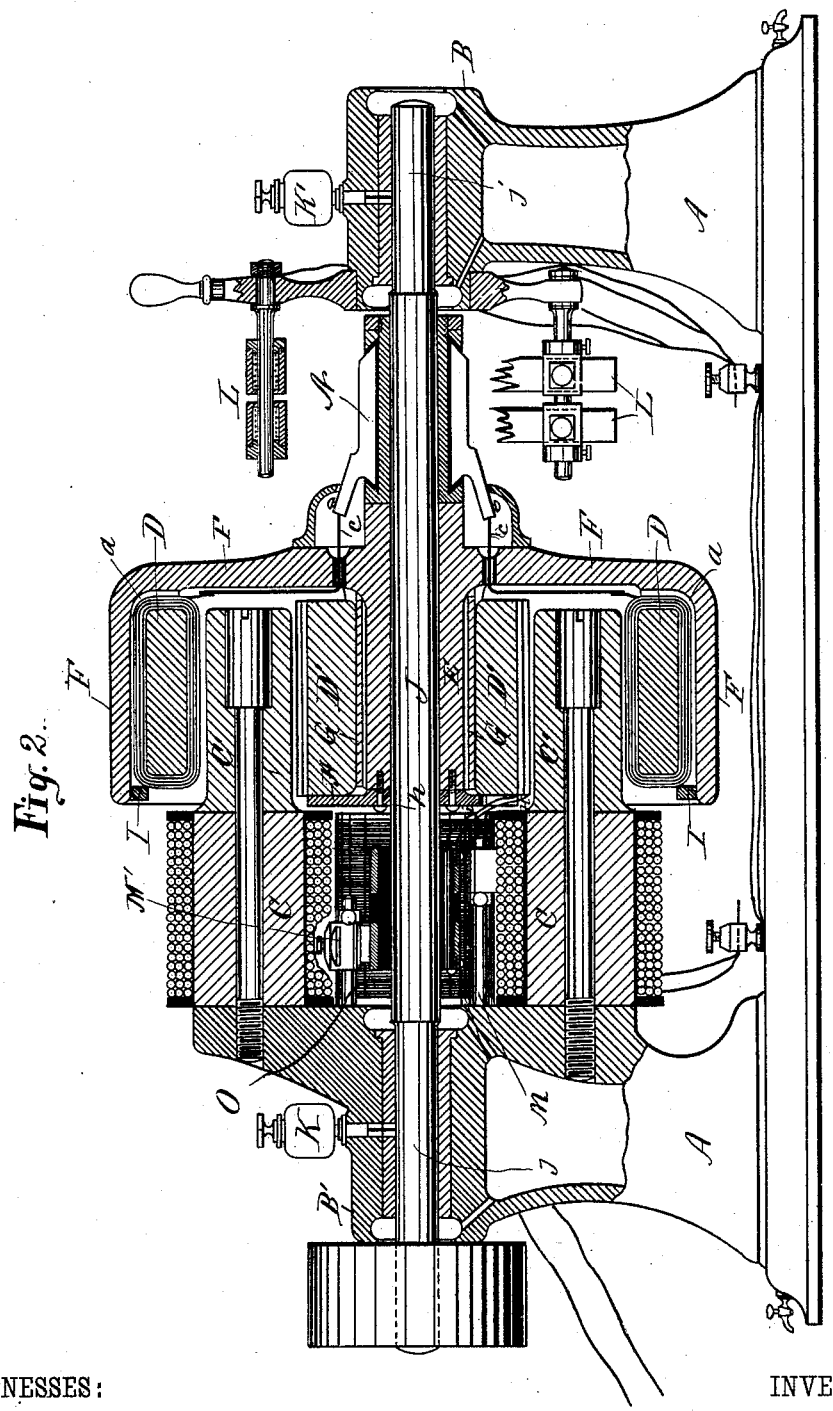

(No Model.) 4 Sheets—Sheet 3.
E. H. BENNETT, Jr.
ELECTRIC MACHINE.

No. 407,154. Patented July 16, 1889.

WITNESSES:
Thomas S. Walling
Arthur C. Webb

INVENTOR
Edwin H. Bennett Jr.
By Ernest C. Webb
His Atty (No Model.)  4 Sheets—Sheet 4.

E. H. BENNETT, Jr.
ELECTRIC MACHINE.

No. 407,154.  Patented July 16, 1889.

WITNESSES:
Thome S. Walling
Arthur C. Webb

INVENTOR
Edwin H. Bennett Jr.
By Ernest C. Webb
his Atty

UNITED STATES PATENT OFFICE.

EDWIN H. BENNETT, JR., OF BAYONNE, NEW JERSEY.

ELECTRIC MACHINE.

SPECIFICATION forming part of Letters Patent No. 407,154, dated July 16, 1889.

Application filed February 23, 1889. Serial No. 300,907. (No model.)

*To all whom it may concern:*

Be it known that I, EDWIN H. BENNETT, Jr., a citizen of the United States, residing at Bayonne, in the county of Hudson and State of New Jersey, have invented certain new and useful Improvements in Electric Machines, of which the following is a full, clear, and exact description.

My invention relates to certain improvements in electric machines adapted to be used as generators or motors, the object being, generally speaking, to produce a machine capable of being practically used for either purpose, which shall be simple and economical in construction, efficient and reliable in operation, and of compact form. Specifically I seek to produce an electric generator (capable of use as a motor) in which nearly all the magnetic lines of force are cut by the coil or wires of the armature and utilized, so that very powerful currents of electricity are produced.

In carrying out my invention I employ two armatures suitably fastened to and rotating with the shaft of the machine and around the pole-pieces of stationary magnets, the latter being located between the armatures.

I am aware that heretofore a single ring-armature has been employed, arranged to rotate around stationary field-magnets and inclosing said magnets, and I am also aware that with machines of this construction very good results have been produced, particularly for light work. Machines of this character, however, differ from my invention not only in construction, but in the results produced. For instance, by employing two armatures rotating around the field I not only obtain a higher efficiency in the machine, but I am able to vary the current without changing the speed of the machine. The first-mentioned result is obtained because with two armatures revolving around the field on opposite sides thereof a larger area is covered and inclosed by the wires of the armatures, and more magnetic lines of force are cut by said armatures than in the case of a single armature. The last-mentioned result is produced because by having two armatures and two commutators, for instance, I can connect them in series, so that the potential of one is added to the potential of the other; or I can connect them in multiple arc, so that the current strength of one is added to the other without in either case changing the speed of the machine. This cannot be practically accomplished in a machine having a single ring-armature revolving around the field, or in a machine of ordinary construction, such as a stationary Gramme ring and rotating field-magnets, because in either case the armature is wound to give a certain potential at a given speed, and this potential can only be varied by changing the speed of the machine or by providing a resistance in the field, neither method being desirable to obtain the best practical results.

I will now describe my invention in detail in connection with the accompanying drawings, in which—

Figure 4:
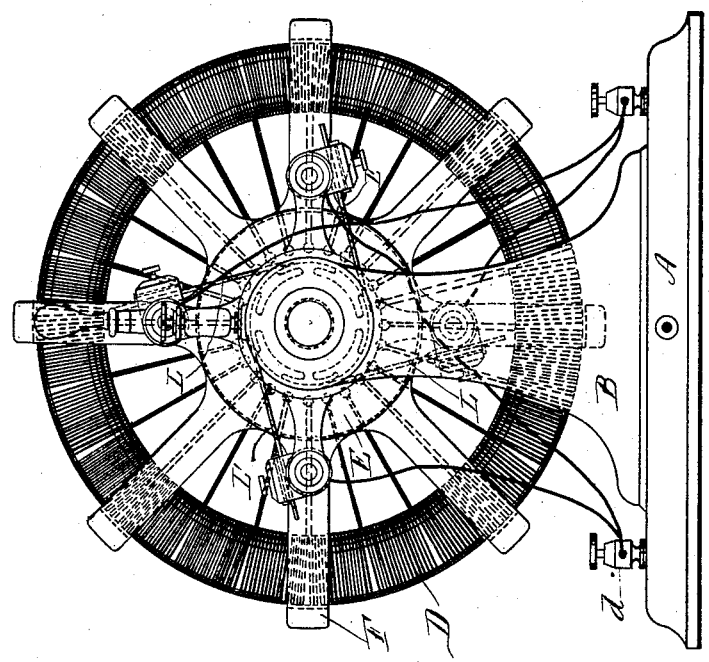
Figure 3:
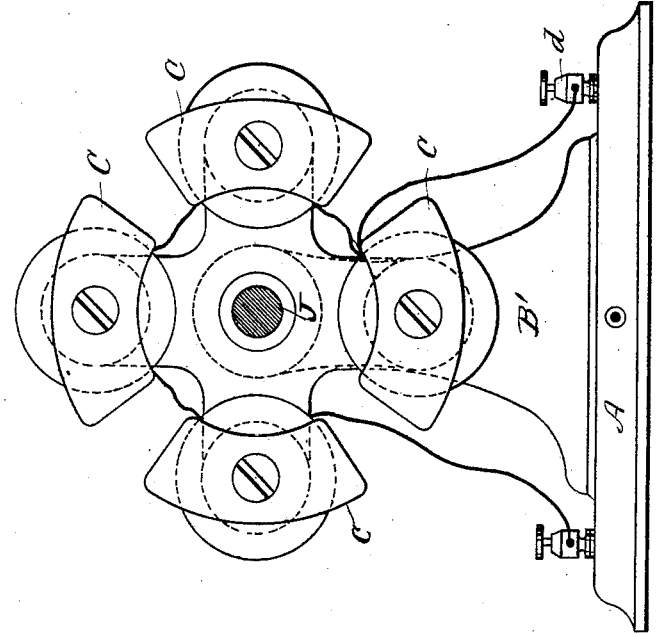
Figure 5:
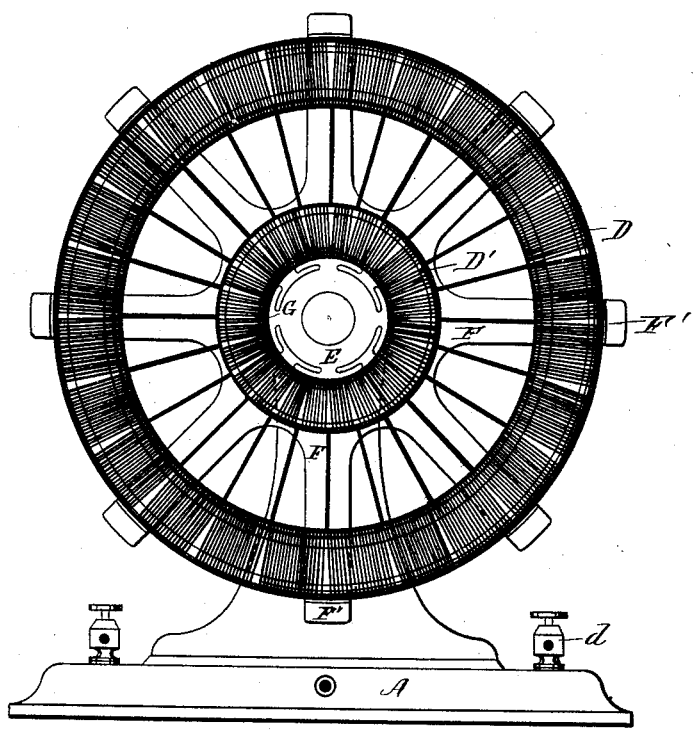

Figure 1 is a longitudinal section of my machine. Fig. 2 is a similar view of a modification of the same for producing alternating currents. Fig. 3 is a side view in elevation of the field-magnets. Fig. 4 is a similar view of the outside armature and supporting-frame, and Fig. 5 is a similar view of the outside and inside armatures.

A designates the frame, and B B' brackets, in which the bearings for the shaft J are formed. The bracket B' supports the field-magnets C, preferably four in number, which may be bolted to said bracket B', as shown, or, if preferred, may be cast solid therewith. The shaft J carries a spider or skeleton frame E, having a hub surrounding and fast to said shaft, and provided with arms F, radiating therefrom and terminating in flanges F'. Within this skeleton frame E two armatures D D' are housed and secured in place, so that they will simultaneously rotate with the shaft. These armatures are preferably of the construction known as the "Gramme ring," (except as described in reference to Fig. 2, illustrating an alternating-current machine,) and they are respectively held in place as follows, viz: The outer armature D is snugly fitted in the flanges F', which are cored out interiorly to receive it, and a ring I is then sprung into position at the outer edges of said flanges and holds the said armature D in place. The inner armature D' is also snugly fitted over flanges G on the hub of the frame E, and is securely locked in place by means of the collar or ring I, which is made fast to said hub, as by screws $h$. The magnets C are provided with pole-pieces C', which, as shown, are bolted to the magnets and the bracket B'; but, if preferred, these pole-pieces may be cast integral with the magnets or integral with the magnets and brackets. N designates a commutator of suitable construction carried on the shaft J, and L L' designate the collecting-brushes.

As stated in reference to the construction shown in the drawings, excepting Fig. 2, the armatures D D' are each preferably composed of Gramme rings wound in any number of sections, and these sections are each connected to a corresponding commutator-section. In other words, each section of one armature is connected to the corresponding section of the other armature and thence to the corresponding commutator-section. In the operation of the machine the current from each section of each armature meets the current of the corresponding section of the other armature at $b$, Fig. 1, and passes thence to the corresponding commutator-section by means of the connection $c$, Fig. 1. From the commutator the current is taken up by the brushes L L', passing from the positive brushes L' to binding-post $d$ and thence to the line $e$, a portion of said current passing to and around the field-magnets by means of a shunt-winding in a manner well understood. In this connection I desire to say that instead of a shunt-winding I may employ a series winding of the well-known form.

In Fig. 2 of the drawings I have shown my invention as applied to an alternating-current machine. In this costruction I prefer to use an outside armature of the well-known Gramme-ring form, and an inside armature of any desired form suitably wound for an alternating current. In such a machine the current passes from the armature D to the positive brushes L', thence around the field and back to the negative brushes L. The current from the armature D' passes to a conducting device O, of any suitable form, surrounding the shaft J and inclosed by the magnets C, and is taken up by the brushes M M' and passes thence to the line.

I prefer to form the shaft J with reduced ends $j$, and I provide a space $s$ in the bearings of the brackets B B', so that the shaft may have a slight endwise play in said bearings to compensate for the wear. I also provide oil-cups K K', of ordinary construction.

The spaces $a$ between the coils of the armatures and the frame are properly filled with any suitable insulating material.

The shaft J is rotated by means of a pulley P in the usual manner.

From the foregoing description the operation of this machine, either as a generator for a continuous or alternating current or as a motor, will be clear to those skilled in the art.

Obviously mechanical changes in the construction of this machine may be made without departing from the principle of my invention.

What I claim as my invention, and desire to secure by Letters Patent, is—

1. In an electric machine, an inner and outer armature confined within and secured to a frame fast to and revolving with said shaft, in combination with field-magnets having pole-pieces projecting between said armatures, substantially as described.

2. In an electric machine, an inner and an outer revolving ring-armature confined within and supported by a frame mounted upon and fast to the shaft of the machine, in combination with the field-magnets having pole-pieces projecting between said armatures, substantially as described.

3. In an electric machine, the combination of a revolving ring-armature mounted upon a shaft, bearings for said shaft, stationary magnets fast to or formed integral with the bracket forming the bearing for one end of said shaft, pole-pieces fast to or formed integral with said magnets and extending between said armature and another ring-armature confined within and secured to a frame fast to and revolving with said shaft, substantially as described.

4. In an electric machine, the combination of a revolving armature mounted upon a shaft, bearings for said shaft, stationary magnets fast to or formed integral with the bracket forming the bearing for one end of said shaft, pole-pieces fast to or formed integral with said magnets and extending between said armature and a ring-armature confined within and secured to a frame fast to and revolving with said shaft, substantially as described.

5. In an electric machine comprising two revolving ring-armatures, between which are arranged the pole-pieces of stationary field-magnets, a frame or spider for supporting said armatures and connecting them to the shaft, consisting of a hub mounted on said shaft and having flanges to receive the inner armature, and arms radiating from said hub and terminating in flanges to receive the outer armature, substantially as described.

6. In an electric machine comprising two revolving ring-armatures, between which are arranged the pole-pieces of stationary field-magnets, a frame or spider for supporting said armatures and connecting them to the shaft, consisting of a hub mounted on said shaft and having flanges to receive the inner armature, and arms radiating from said hub and terminating in flanges to receive the outer armature, in combination with a collar H and ring I, substantially as described.

7. In an electric machine comprising two revolving armatures, between which are arranged the pole-pieces of stationary field-magnets, a frame or spider for supporting said armatures and connecting them to the shaft, consisting of a hub mounted on said shaft and having flanges to receive the inner armature, and arms radiating from said hub and terminating in flanges to receive the outer armature, in combination with a collar H and ring I, substantially as described.

8. In an electric machine, an inner and outer armature confined within and secured to a frame fast to and revolving with the shaft, in combination with field-magnets having pole-pieces projecting between said armatures, and electrical connections, as described, whereby the current passes from one armature to the field and from the other armature to the line, as and for the purpose set forth.

In testimony whereof I have hereunto set my hand this 19th day of February, A. D. 1889.

EDWIN H. BENNETT, JR.

Witnesses:
   THOMAS S. WALLING,
   FREDERIC CARRAGAN.